(12) United States Patent
Dolfi

(10) Patent No.: US 9,424,122 B2
(45) Date of Patent: Aug. 23, 2016

(54) DIGITAL INFORMATION TRANSFER SYSTEM INCLUDING FAULT PROTECTION

(71) Applicant: Hamilton Sundstrand Corporation, Windsor Locks, CT (US)

(72) Inventor: Eugene W. Dolfi, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 135 days.

(21) Appl. No.: 14/283,573

(22) Filed: May 21, 2014

(65) Prior Publication Data
US 2015/0339181 A1    Nov. 26, 2015

(51) Int. Cl.
*G06F 11/00* (2006.01)
*G06F 11/07* (2006.01)

(52) U.S. Cl.
CPC ....... *G06F 11/0793* (2013.01); *G06F 11/0745* (2013.01)

(58) Field of Classification Search
CPC ........... G06F 11/0745; G06F 11/0754; G06F 11/0796
USPC ......................................................... 714/14
See application file for complete search history.

(56) References Cited

U.S. PATENT DOCUMENTS

| | | | | |
|---|---|---|---|---|
| 6,934,137 B2* | 8/2005 | Elliott | ................ | B64D 11/0015 307/29 |
| 7,256,615 B2* | 8/2007 | Nair | ...................... | H03K 17/063 326/82 |
| 9,140,751 B2* | 9/2015 | Ong | .................. | G01R 31/31715 |
| 2008/0084643 A1* | 4/2008 | Flottemesch | ............. | H02J 3/34 361/93.2 |
| 2010/0123978 A1* | 5/2010 | Lin | ....................... | H02H 7/1213 361/18 |
| 2011/0276190 A1* | 11/2011 | Lillis | ....................... | H02J 3/005 700/293 |
| 2013/0048612 A1* | 2/2013 | Luo | .......................... | B23H 7/16 219/69.16 |
| 2014/0211344 A1* | 7/2014 | Pence | ...................... | H02H 7/06 361/20 |

\* cited by examiner

*Primary Examiner* — Elmira Mehrmanesh
(74) *Attorney, Agent, or Firm* — Cantor Colburn LLP

(57) ABSTRACT

A digital information transfer system includes an electronic driver unit in electrical communication with a power supply to receive an input voltage. The driver converts the input data into output data based on a digital information transfer system protocol. An electronic fault detection is configured to determine a fault condition of the at least one output transmission line based on a comparison between a voltage level of the at least one output transmission line and the input voltage. An electronic fault protection module is in electrical communication with each of the driver unit, the at least one output transmission line and the fault detection module. The electronic fault protection module is configured to selectively disconnect the driver unit from the at least one output transmission line in response to detecting the fault condition.

12 Claims, 3 Drawing Sheets

DIGITAL INFORMATION TRANSFER SYSTEM INCLUDING FAULT PROTECTION

TECHNICAL FIELD

The present invention relates generally to digital information transfer systems, and more particularly, to a digital information transfer system including a fault protection.

BACKGROUND OF THE INVENTION

Aircraft systems include a digital information transfer system (DITS) such as, for example, the ARINC 429 data bus, which are defined and operate according to established technical standards. Conventional digital information transfer systems, however, do not adequately protect against voltage faults existing on the output transmission line such as, for example, a 28 volt direct current (VDC) short circuit. In addition, conventional digital information transfer systems are incapable of quickly reestablishing the digital information transfer system in response to removing the fault condition.

SUMMARY

According to an embodiment, a digital information transfer system includes an electronic driver unit in electrical communication with a power supply to receive an input voltage. The driver converts the input data into output data based on a digital information transfer system protocol. An electronic fault detection is configured to determine a fault condition of the at least one output transmission line based on a comparison between a voltage level of the at least one output transmission line and the input voltage. An electronic fault protection module is in electrical communication with each of the driver unit, the at least one output transmission line and the fault detection module. The electronic fault protection module is configured to selectively disconnect the driver unit from the at least one output transmission line in response to detecting the fault condition.

According to another embodiment, a method of protecting a digital information transfer system from a short circuit fault comprises delivering an input voltage to a driver unit. The driver unit is configured to convert input data into output data based on a digital information transfer system protocol and to deliver the output data to at least one output transmission line. The method further includes determining a short circuit at the at least one output transmission line based on a comparison between a voltage level of the at least one output transmission line and the input voltage. The method further includes selectively disconnecting the driver unit from the at least one output transmission line in response to detecting the short circuit such that the driver unit is isolated from a direct current voltage source provided by the short circuit.

BRIEF DESCRIPTION OF THE DRAWINGS

The subject matter which is regarded as the invention is particularly pointed out and distinctly claimed in the claims at the conclusion of the specification. The foregoing feature of the various embodiments are apparent from the following detailed description taken in conjunction with the accompanying drawings in which:

DETAILED DESCRIPTION

A DITS according to at least one non-limiting embodiment includes a driver unit connected to HI and LO output transmission lines. The DITS further includes a fault protection system that selectively isolates the driver unit from the HI and/or LO output transmission lines in response to detecting a fault condition such as, for example, a 28 VDC short circuit, on the HI and/or LO output transmission lines. The fault protection system is further configured to re-establish normal operation of the DITS by re-connecting the driver unit and the HI and/or LO output transmission lines in response to removing the fault condition. The recovery from the fault condition may be initiated automatically and/or manually be a user of the system.

Figure 1A:
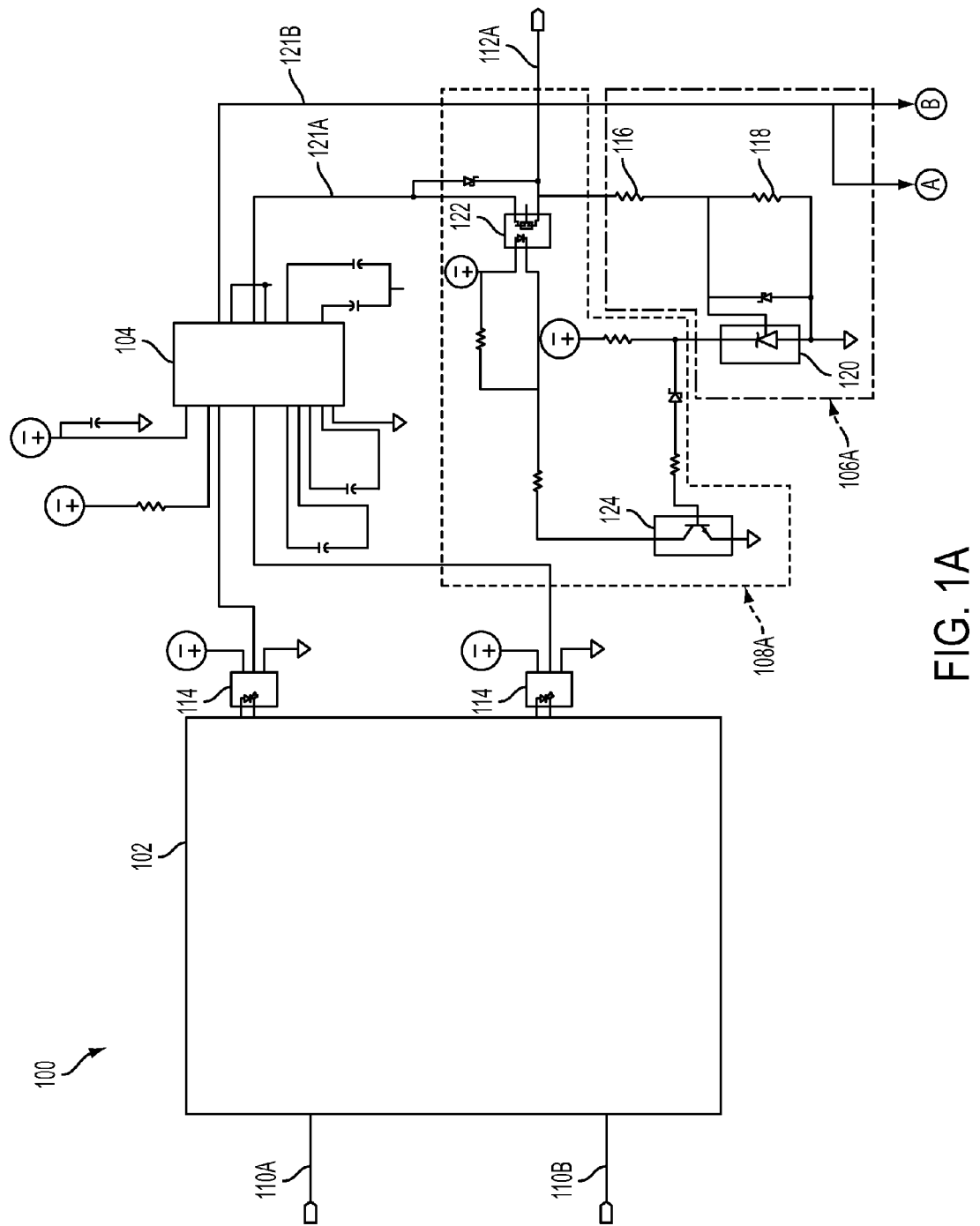
FIGS. 1A and 1B illustrate a schematic diagram of a digital information transfer system (DITS) including a fault detection and protection system according to an embodiment.
Figure 1B:
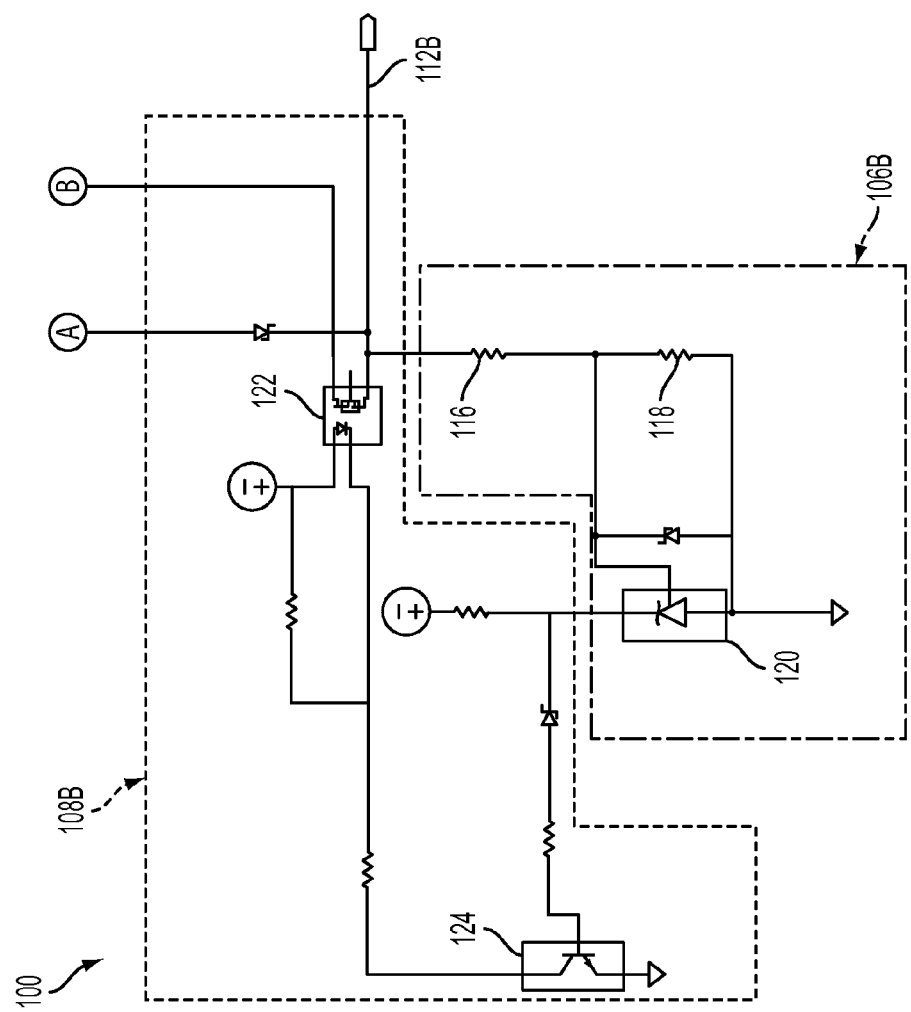

Referring to FIGS. 1A and 1B, a schematic diagram of a DITS 100 including a fault protection system is illustrated according to an embodiment. According to a non-limiting embodiment, the DITS 100 is a dual-wired DITS 100 that operates according to various data transfer standards including, but not limited to, ARINC 429. The dual-wired DITS 100 includes a HI input transmission line 110A, a HI output transmission line 112A, a LO input transmission line 110A and a LO output transmission line 112B as further shown in FIGS. 1A and 1B. The HI input transmission line 110A and the HI output transmission line 112A may be configured to receive and transmit positive data values. The L input transmission line 110B and the LO output transmission line 112B may be configured to receive and transmit negative data values.

The DITS 100 includes an electronic data input interface 102, an electronic driver unit 104, an electronic fault detection module 106A/106B, and an electronic fault protection module 108A/108B. The data input interface 102 is configured to receive input data at the HI and/or LO input transmission lines 110A/110B and to convert the input data into respective logic signals.

The driver unit 104 is in electrical communication with the data input interface 102 and the HI/LO output transmission lines 112A/112B. The driver unit 104 receives a supply voltage of, for example 3.3 V, and is configured to convert the logic signals output from the data input interface 102 into data messages. The data messages correspond to a respective data transfer standard such as, for example, ARINC 429. The data messages are then output from the driver unit 104 and transmitted onto the HI and/or LO output transmission lines 112A/112B. The driver unit 104 may further include internal transient voltage protection circuitry that protects the driver unit 102 from high-voltage transient events such as, for example, lightning strikes.

According to an embodiment one or more interface isolation units 114 may be interposed between the data input interface 102 and the driver unit 104. The interface isolation units 114 may be configured to selectively break the electrical connection between the data input interface 102 and the driver unit 104 in response to a fault condition. The fault condition may include, but is not limited to, a high-voltage transient event that causes an over-voltage in the data input interface 102.

The first fault detection module 106A is configured to compare an output voltage existing on the HI output transmission lines 112A to a voltage threshold set according to the input supply voltage. If the output voltage exceeds the voltage threshold, the first fault detection module 106A outputs a fault detection signal that commands the first fault protection module 108A to interrupt the electrical connection between the driver unit 104 and the HI output transmission line 112A as discussed in greater detail below. In one example, the first fault detection module 106A is configured to determine a fault conditions exists on the HI output transmission line 112A in response to the voltage level of the HI output transmission line 112A exceeding the input supply voltage.

According to a non-limiting embodiment, the first fault detection module 106A includes a first resistor 116, a second resistor 118, and a voltage reference component 120. The voltage reference component 120 may include, for example, a diode having a cathode, an anode, and a reference voltage input. The first resistor 116, second resistor 118, and voltage reference component 120 are connected in such a manner to form a voltage divider as illustrated in FIGS. 1A and 1B. For example, a first end of the first resistor 116 is connected to the HI output transmission line 112A. A first end of the second resistor 118 and the anode are connected to a common reference point (e.g., ground). The cathode is connected to the supply voltage to set a threshold voltage. The reference voltage input is connected to the second ends of the first and second resistors 116/118 (i.e., the output of the voltage divider). In this manner, the output of the voltage divider provides a bias voltage value that is compared to the voltage threshold (e.g., the supply voltage). The values of the first resistor and the second resistor can be selected to tune the reference voltage value the tolerance at which the fault protection is enabled. When the output of the voltage divider exceeds the supply voltage, the diode conducts current therethrough. In this manner, the voltage reference component detects an existing fault condition (e.g., a short circuit to 28 VDC) on the HI output transmission line 112A and generates a fault detection signal the commands the first fault protection module 108A to interrupt the electrical connection between the driver unit 104 and the HI output transmission line 112A.

The first fault protection module 108A is configured to interrupt the electrical connection between the driver unit 104 and the HI output transmission line 112A in response to receiving the fault detection signal output from the first fault detection module 106A. The first fault protection module 108A includes an isolation unit 122 in electrical communication with and a fault protection switch 124. The fault protection switch 124 is selectively enabled based on the fault detection signal output from the first fault detection module 106A. When fault protection switch 124 is disabled, the isolation unit 122 is closed such that the driver unit 104 is electrically connected to the HI output transmission line 112A. When the fault protection switch is enabled, however, the isolation unit 122 is opened such that the driver unit 104 is disconnected from the HI output transmission line 112A. In this manner, the driver unit 104 is electrically isolated from the fault condition (e.g., a 28 VDC short circuit) existing on the HI output transmission line 112A. Although a value of 28 VDC is described, it is appreciated that the voltage level is not limited thereto.

According to a non-limiting embodiment, the isolation unit 122 is an opto-isolator. The opto-isolator that includes a dielectric barrier interposed between a light emitting diode (LED) and a phototransistor. The LED includes an anode connected to the power supply and a cathode that receives a protection signal from the fault protection module 124. The phototransistor includes a source terminal connected to a first output 121A (e.g., HI output) of the driver unit 104 and a drain terminal connected to the HI output transmission line 112A. The gate of the phototransistor detects light emitted by the LED. The opto-isolator may be closed-biased, for example. In this manner, the HI output 121A of the driver unit 104 is connected to the HI output transmission line 112A when the LED is off (i.e., no light is emitted). When the LED is turned on and emits light, however, the phototransistor is turned off such that the HI output 121A of the driver unit 104 is disconnected (i.e., electrically isolated) from the HI output transmission line 112A.

According to a non-limiting embodiment, the fault protection switch 124 is a transistor. The drain terminal is connected to the reference point (i.e., ground), the source terminal is connected to the cathode of the LED, and the gate terminal is connected to the output of the first fault detection module 106A (e.g., the cathode of the voltage reference component). The fault protection switch 124 is enabled when the gate terminal receives the fault detection signal from the first fault detection module 106A. The fault detection signal switches on the transistor, thereby inducing current to flow through the LED. The current causes the LED to emit light, thereby disconnecting the HI output 121A of the driver unit 104 from the HI output transmission line 112A. Accordingly, the driver unit 104 is electrically isolated from a fault condition existing on the HI output transmission line 112A.

When the fault condition is removed from the HI output transmission line 112A, the first fault detection module 106A stop generating the fault detection signal. Accordingly, the transistor is switched off such that the first fault protection module 108A stops generating the protection signal. This in turn switches off the LED, thereby re-connecting the HI output 121A of the driver unit 104 to the HI output transmission line 112A. In this manner, the driver unit 104 may quickly and automatically return the DITS 100 to normal operation in response to removing the fault condition.

Although only the first fault detection module 106A and the first fault protection module 108A are described above, it is appreciated, that the second fault detection module 106B and the second fault protection module 108B dedicated to the LO output transmission line 112B may operate in a similar manner.

As described in detail above, at least one embodiment of the present inventive teachings provides a DITS that includes a fault protection system capable of protecting the driver unit from a 28 VDC fault condition. A fault protection module is configured to selectively isolate the driver unit from the HI and/or LO output transmission lines when the fault detection module detects a fault condition such as, for example, a 28 VDC short circuit, on the HI and/or LO output transmission lines. The fault protection system is further configured to quickly re-establish normal operation of the DITS by re-connecting the driver unit and the HI and/or LO output transmission lines in response to removing the fault condition.

Figure 2:
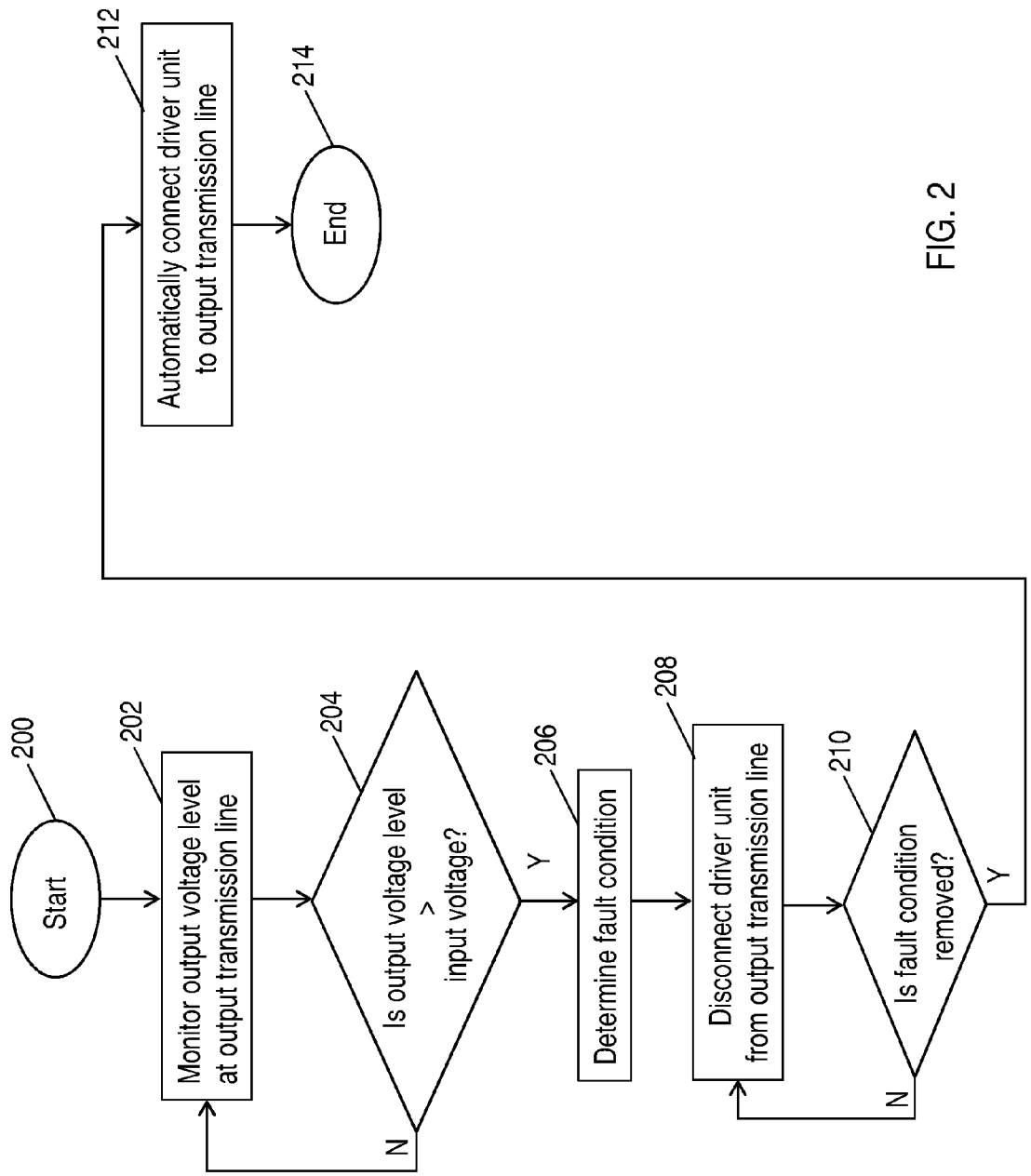
FIG. 2 is a flow diagram illustrating a method of protecting a digital information transfer system from a fault condition according to an embodiment.

Turning now to FIG. 2, a flow diagram illustrates a method of protecting a digital information transfer system from a fault condition according to an embodiment. The method begins at operation 200 and proceeds to operation 202 where the output voltage level at the output transmission line is monitored. At operation 204, the output voltage level is compared to an input voltage. The input voltage includes, for example, an input voltage delivered to a driver unit that is configured to convert input data into output data based on a digital information transfer system protocol and to deliver the output data to at least one output transmission line. If the output voltage level does not exceed the input voltage, then the method returns to operation 202 and continues monitoring the output voltage level. If, however, the output voltage level exceeds the input voltage, then a fault condition, such as a short circuit to 28 VDC for example, is determined at operation 206. At operation 208, the driver unit is disconnected from the output transmission line. Accordingly, the driver unit is isolated from the fault condition, e.g., a direct current voltage source delivered by the short circuit.

At operation 210, a determination is made as to whether the fault condition is removed. If the fault condition is not removed, the method returns to operation 208 and the driver unit remains disconnected from the output transmission line. If the fault condition is removed, however, the driver unit is automatically connected to the output transmission at operation 212, and returns to normal operating conditions before the method ends at operation 214.

As used herein, the term "module" refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that various embodiments of the invention may include only some of the described features. Accordingly, the invention is not to be seen as limited by the foregoing description, but is only limited by the scope of the appended claims.

The invention claimed is:

1. A digital information transfer system, comprising:
an electronic driver unit in electrical communication with a power supply to receive an input voltage, the driver unit configured to convert input data into output data based on a digital information transfer system protocol and to deliver the output data to at least one output transmission line;
an electronic fault detection module in electrical communication with the power supply and the at least one output transmission line, the fault detection module configured to determine a fault condition of the at least one output transmission line based on a comparison between a voltage level of the at least one output transmission line and the input voltage, the fault condition including a short circuit to a voltage supply internal to the digital information transfer system; and
an electronic fault protection module in electrical communication with each of the driver unit, the at least one output transmission line and the fault detection module, the electronic fault protection module configured to selectively disconnect the driver unit from the at least one output transmission line in response to detecting the fault condition,
wherein the at least one output transmission line includes a first output transmission line for outputting a positive data value and a second output transmission line for outputting a negative data value.

2. The digital information transfer system of claim 1, wherein the electronic fault protection module automatically reconnects the driver unit to the at least one output transmission line in response to removing the fault condition.

3. The digital information transfer system of claim 2, wherein the fault detection module detects the fault condition in response to the voltage level exceeding the input voltage.

4. The digital information transfer system of claim 3, wherein the fault protection module comprises:
a fault protection switch that generates a fault protection signal when the fault condition is detected; and
an isolation unit interposed between the driver unit and the at least one output transmission line, the isolation unit configured to disconnect the driver unit from the at least one output transmission line in response to receiving the fault protection signal, and to automatically reconnect the driver unit to the at least one output transmission line when failing to receive the fault protection signal.

5. The digital information transfer system of claim 4, wherein the fault detection module comprises:
a voltage divider in electrical communication with the at least output transmission line, the voltage divider configured to output a bias voltage value based on the voltage level of the at least one output transmission line; and
a voltage reference component in electrical communication with the power supply to receive the input voltage and the voltage divider to receive the bias voltage value, the voltage reference component configured to output a fault detection signal indicating the fault condition to the fault protection switch in response to the bias voltage value exceeding the input voltage.

6. The digital information transfer system of claim 1, wherein the protocol is ARINC 429.

7. A method of protecting a digital information transfer system from a short circuit fault, the method comprising:
delivering an input voltage to a driver unit that is configured to convert input data into output data based on a digital information transfer system protocol and to deliver the output data to at least one output transmission line;
determining a short circuit at the at least one output transmission line based on a comparison between a voltage level of the at least one output transmission line and the input voltage; and
selectively disconnecting the driver unit from the at least one output transmission line in response to detecting the short circuit such that the driver unit is isolated from a direct current voltage source provided by the short circuit,
wherein the at least one output transmission line includes a first output transmission line for outputting a positive data value and a second output transmission line for outputting a negative data value.

8. The method of claim 7, further comprising automatically reconnecting the driver unit to the at least one output transmission line in response to removing the short circuit.

9. The method of claim 8, further comprising detecting the short circuit in response to the voltage level exceeding the input voltage.

10. The method of claim 9, wherein the selectively disconnecting further comprises:
generating a fault protection signal in response to detecting the short circuit; and isolating the driver unit from the at least one output transmission line in response to receiving the fault protection signal, and to automatically reconnecting the driver unit to the at least one output transmission line when failing to receive the fault protection signal.

11. The method of claim 10, wherein the determining a short circuit further comprises:

generating a bias voltage value based on the voltage level of the at least one output transmission line; and generating a fault detection signal indicating the short circuit in response to the bias voltage value exceeding the input voltage.

12. The method of claim 7, wherein the protocol is ARINC 429.

* * * * *